(12) United States Patent
Hashimoto et al.

(10) Patent No.: US 11,874,580 B2
(45) Date of Patent: *Jan. 16, 2024

(54) FOLDABLE ELECTROPHORETIC DISPLAY MODULE INCLUDING NON-CONDUCTIVE SUPPORT PLATE

(71) Applicant: E INK CORPORATION, Billerica, MA (US)

(72) Inventors: Keisuke Hashimoto, Tokyo (JP); Kenji Nakazawa, Tokyo (JP); Bamboo Tsai, Hsinchu (TW); Yung-Sheng Chang, Hsinchu (TW); JiaJiun Yeh, Hsinchu (TW); Hsintao Huang, Hsinchu (TW)

(73) Assignee: E Ink Corporation, Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/973,897

(22) Filed: Oct. 26, 2022

(65) Prior Publication Data
US 2023/0051151 A1    Feb. 16, 2023

Related U.S. Application Data

(63) Continuation of application No. 17/335,218, filed on Jun. 1, 2021, now Pat. No. 11,513,415.
(Continued)

(51) Int. Cl.
*G02F 1/167*     (2019.01)
*G02F 1/1677*    (2019.01)
*G09F 9/30*      (2006.01)

(52) U.S. Cl.
CPC ............ *G02F 1/167* (2013.01); *G02F 1/1677* (2019.01); *G09F 9/301* (2013.01)

(58) Field of Classification Search
CPC ...... G09F 9/301; G06F 1/1616; G06F 1/1641; G06F 1/1652; G06F 3/044; G06F 3/046;
(Continued)

(56) References Cited

U.S. PATENT DOCUMENTS 5,760,761 A    6/1998  Sheridon
5,777,782 A    7/1998  Sheridon
(Continued)

FOREIGN PATENT DOCUMENTS

TW    201822174 A    6/2018
WO    1999067678 A2  12/1999
(Continued)

OTHER PUBLICATIONS

Wood, D., "An Electrochromic Renaissance?" Information Display, 18(3), 24 (Mar. 2002).
(Continued)

*Primary Examiner* — Joe H Cheng
(74) *Attorney, Agent, or Firm* — Brian D. Bean

(57) ABSTRACT

An electrophoretic display including a low-modulus adhesive foam. The electrophoretic display additionally includes a conductive integrated barrier layer including a light-transmissive electrode and a moisture barrier. In some embodiments, the resulting electrophoretic display may include touch sensing, a front light, color, and a digitizing layer to record interactions with a stylus. In some embodiments, the display includes a color filter array.

10 Claims, 7 Drawing Sheets

Related U.S. Application Data

(60) Provisional application No. 63/033,954, filed on Jun. 3, 2020.

(58) Field of Classification Search
CPC . G06F 2203/04102; G06F 2203/04103; G06F 2203/04106; G02F 1/167; G02F 1/16753; G02F 1/16755; G02F 1/1677
See application file for complete search history.

(56) References Cited

U.S. PATENT DOCUMENTS

| | | |
|---|---|---|
| 5,808,783 A | 9/1998 | Crowley |
| 6,054,071 A | 4/2000 | Mikkelsen, Jr. |
| 6,055,091 A | 4/2000 | Sheridon et al. |
| 6,097,531 A | 8/2000 | Sheridon |
| 6,124,851 A | 9/2000 | Jacobson |
| 6,128,124 A | 10/2000 | Silverman |
| 6,130,773 A | 10/2000 | Jacobson et al. |
| 6,137,467 A | 10/2000 | Sheridon et al. |
| 6,147,791 A | 11/2000 | Sheridon |
| 6,177,921 B1 | 1/2001 | Comiskey et al. |
| 6,232,950 B1 | 5/2001 | Albert et al. |
| 6,252,564 B1 | 6/2001 | Albert et al. |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,376,828 B1 | 4/2002 | Comiskey |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,480,182 B2 | 11/2002 | Turner et al. |
| 6,498,114 B1 | 12/2002 | Amundson et al. |
| 6,506,438 B2 | 1/2003 | Duthaler et al. |
| 6,518,949 B2 | 2/2003 | Drzaic |
| 6,521,489 B2 | 2/2003 | Duthaler et al. |
| 6,535,197 B1 | 3/2003 | Comiskey et al. |
| 6,545,291 B1 | 4/2003 | Amundson et al. |
| 6,639,578 B1 | 10/2003 | Comiskey et al. |
| 6,657,772 B2 | 12/2003 | Loxley |
| 6,664,944 B1 | 12/2003 | Albert et al. |
| D485,294 S | 1/2004 | Albert |
| 6,680,725 B1 | 1/2004 | Jacobson |
| 6,683,333 B2 | 1/2004 | Kazlas et al. |
| 6,724,519 B1 | 4/2004 | Comiskey et al. |
| 6,750,473 B2 | 6/2004 | Amundson et al. |
| 6,816,147 B2 | 11/2004 | Albert |
| 6,819,471 B2 | 11/2004 | Amundson et al. |
| 6,825,068 B2 | 11/2004 | Denis et al. |
| 6,831,769 B2 | 12/2004 | Holman et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,873,452 B2 | 3/2005 | Tseng et al. |
| 6,909,532 B2 | 6/2005 | Chung et al. |
| 6,922,276 B2 | 7/2005 | Zhang et al. |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,030,412 B1 | 4/2006 | Drzaic et al. |
| 7,072,095 B2 | 7/2006 | Liang et al. |
| 7,075,502 B1 | 7/2006 | Drzaic et al. |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson et al. |
| 7,144,942 B2 | 12/2006 | Zang et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,256,766 B2 | 8/2007 | Albert et al. |
| 7,259,744 B2 | 8/2007 | Arango et al. |
| 7,280,094 B2 | 10/2007 | Albert |
| 7,301,693 B2 | 11/2007 | Chaug et al. |
| 7,304,780 B2 | 12/2007 | Liu et al. |
| 7,327,346 B2 | 2/2008 | Chung et al. |
| 7,327,511 B2 | 2/2008 | Whitesides et al. |
| 7,339,715 B2 | 3/2008 | Webber et al. |
| 7,347,957 B2 | 3/2008 | Wu et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,401,758 B2 | 7/2008 | Liang et al. |
| 7,411,719 B2 | 8/2008 | Paolini, Jr. et al. |
| 7,442,587 B2 | 10/2008 | Amundson et al. |
| 7,453,445 B2 | 11/2008 | Amundson |
| 7,492,497 B2 | 2/2009 | Paolini, Jr. et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,560,004 B2 | 7/2009 | Pereira et al. |
| 7,583,427 B2 | 9/2009 | Danner et al. |
| 7,598,173 B2 | 10/2009 | Ritenour et al. |
| 7,605,799 B2 | 10/2009 | Amundson et al. |
| 7,636,191 B2 | 12/2009 | Duthaler et al. |
| 7,649,674 B2 | 1/2010 | Danner et al. |
| 7,667,886 B2 | 2/2010 | Danner et al. |
| 7,672,040 B2 | 3/2010 | Sohn et al. |
| 7,679,814 B2 | 3/2010 | Paolini, Jr. et al. |
| 7,688,497 B2 | 3/2010 | Danner et al. |
| 7,715,088 B2 | 5/2010 | Liang et al. |
| 7,733,335 B2 | 6/2010 | Zehner et al. |
| 7,785,988 B2 | 8/2010 | Amundson et al. |
| 7,830,592 B1 | 11/2010 | Sprague et al. |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,880,958 B2 | 2/2011 | Zang et al. |
| 7,893,435 B2 | 2/2011 | Kazlas et al. |
| 7,898,717 B2 | 3/2011 | Patry et al. |
| 7,902,547 B2 | 3/2011 | Aoki |
| 7,905,977 B2 | 3/2011 | Qi et al. |
| 7,957,053 B2 | 6/2011 | Honeyman et al. |
| 7,986,450 B2 | 7/2011 | Cao et al. |
| 8,009,344 B2 | 8/2011 | Danner et al. |
| 8,027,081 B2 | 9/2011 | Danner et al. |
| 8,049,947 B2 | 11/2011 | Danner et al. |
| 8,072,675 B2 | 12/2011 | Lin et al. |
| 8,077,141 B2 | 12/2011 | Duthaler et al. |
| 8,089,453 B2 | 1/2012 | Comiskey et al. |
| 8,120,836 B2 | 2/2012 | Lin et al. |
| 8,159,636 B2 | 4/2012 | Sun et al. |
| 8,208,193 B2 | 6/2012 | Patry et al. |
| 8,237,892 B1 | 8/2012 | Sprague et al. |
| 8,238,021 B2 | 8/2012 | Sprague et al. |
| 8,362,488 B2 | 1/2013 | Chaug et al. |
| 8,373,211 B2 | 2/2013 | Amundson et al. |
| 8,389,381 B2 | 3/2013 | Amundson et al. |
| 8,395,836 B2 | 3/2013 | Lin |
| 8,431,941 B2 | 4/2013 | Aoki et al. |
| 8,437,069 B2 | 5/2013 | Lin |
| 8,441,414 B2 | 5/2013 | Lin |
| 8,456,589 B1 | 6/2013 | Sprague et al. |
| 8,498,042 B2 | 7/2013 | Danner et al. |
| 8,514,168 B2 | 8/2013 | Chung et al. |
| 8,547,628 B2 | 10/2013 | Wu et al. |
| 8,576,162 B2 | 11/2013 | Kang |

(56) References Cited

U.S. PATENT DOCUMENTS

| | | |
|---|---|---|
| 8,610,988 B2 | 12/2013 | Zehner et al. |
| 8,714,780 B2 | 5/2014 | Ho et al. |
| 8,728,266 B2 | 5/2014 | Danner et al. |
| 8,743,077 B1 | 6/2014 | Sprague |
| 8,754,859 B2 | 6/2014 | Gates et al. |
| 8,797,258 B2 | 8/2014 | Sprague |
| 8,797,633 B1 | 8/2014 | Sprague et al. |
| 8,797,636 B2 | 8/2014 | Yang et al. |
| 8,830,560 B2 | 9/2014 | Danner et al. |
| 8,891,155 B2 | 11/2014 | Danner et al. |
| 8,969,886 B2 | 3/2015 | Amundson |
| 9,025,234 B2 | 5/2015 | Lin |
| 9,025,238 B2 | 5/2015 | Chan et al. |
| 9,030,374 B2 | 5/2015 | Sprague et al. |
| 9,048,443 B2 | 6/2015 | Namjung et al. |
| 9,140,952 B2 | 9/2015 | Sprague et al. |
| 9,147,364 B2 | 9/2015 | Wu et al. |
| 9,152,003 B2 | 10/2015 | Danner et al. |
| 9,152,004 B2 | 10/2015 | Paolini, Jr. et al. |
| 9,201,279 B2 | 12/2015 | Wu et al. |
| 9,223,164 B2 | 12/2015 | Lai et al. |
| 9,279,906 B2 | 3/2016 | Kang |
| 9,285,648 B2 | 3/2016 | Liu et al. |
| 9,310,661 B2 | 4/2016 | Wu et al. |
| 9,348,362 B2 | 5/2016 | Ko et al. |
| 9,419,024 B2 | 8/2016 | Amundson et al. |
| 9,419,065 B2 | 8/2016 | Degner et al. |
| 9,454,057 B2 | 9/2016 | Wu et al. |
| 9,529,240 B2 | 12/2016 | Paolini, Jr. et al. |
| 9,530,831 B2 | 12/2016 | Lee et al. |
| 9,582,041 B2 | 2/2017 | Cheng et al. |
| 9,620,066 B2 | 4/2017 | Bishop |
| 9,632,373 B2 | 4/2017 | Huang et al. |
| 9,666,142 B2 | 5/2017 | Hung |
| 9,671,635 B2 | 6/2017 | Paolini, Jr. |
| 9,778,500 B2 | 10/2017 | Gates et al. |
| 9,841,653 B2 | 12/2017 | Wu et al. |
| 9,881,979 B2 | 1/2018 | Sato et al. |
| 9,921,451 B2 | 3/2018 | Telfer et al. |
| 9,983,424 B2 | 5/2018 | Kim et al. |
| 10,028,395 B2 | 7/2018 | Chen et al. |
| 10,032,419 B2 | 7/2018 | Lin et al. |
| 10,037,735 B2 | 7/2018 | Amundson |
| 10,048,563 B2 | 8/2018 | Paolini, Jr. et al. |
| 10,048,564 B2 | 8/2018 | Paolini, Jr. et al. |
| 10,190,743 B2 | 1/2019 | Hertel et al. |
| 10,209,556 B2 | 2/2019 | Rosenfeld et al. |
| 10,362,696 B2 | 7/2019 | Ahn |
| 10,446,585 B2 | 10/2019 | Harris et al. |
| 10,466,564 B2 | 11/2019 | Kayal et al. |
| 10,495,941 B2 | 12/2019 | Hashimoto et al. |
| 10,579,105 B2 | 3/2020 | Jones et al. |
| 10,613,407 B2 | 4/2020 | Lin et al. |
| 10,755,991 B2 | 8/2020 | Park et al. |
| 10,884,457 B2 | 1/2021 | Hong et al. |
| 11,513,415 B2 * | 11/2022 | Hashimoto ............. G06F 3/044 |
| 2002/0060321 A1 | 5/2002 | Kazlas et al. |
| 2004/0027327 A1* | 2/2004 | LeCain ................. G02F 1/1675 |
| | | 345/107 |
| 2004/0085619 A1 | 5/2004 | Wu et al. |
| 2004/0105036 A1 | 6/2004 | Danner et al. |
| 2005/0122306 A1 | 6/2005 | Wilcox et al. |
| 2005/0122563 A1 | 6/2005 | Honeyman et al. |
| 2006/0255322 A1 | 11/2006 | Wu et al. |
| 2007/0052757 A1 | 3/2007 | Jacobson |
| 2009/0122389 A1 | 5/2009 | Whitesides et al. |
| 2009/0315044 A1 | 12/2009 | Amundson et al. |
| 2010/0177396 A1 | 7/2010 | Lin |
| 2011/0133196 A1* | 6/2011 | Yamazaki ............... H01L 29/45 |
| | | 257/E29.291 |
| 2011/0140744 A1 | 6/2011 | Kazlas et al. |
| 2011/0187683 A1 | 8/2011 | Wilcox et al. |
| 2011/0292319 A1 | 12/2011 | Cole |
| 2014/0078024 A1 | 3/2014 | Paolini, Jr. et al. |
| 2014/0192000 A1 | 7/2014 | Hung et al. |
| 2014/0210701 A1 | 7/2014 | Wu et al. |
| 2016/0077375 A1 | 3/2016 | Lin |
| 2017/0104090 A1 | 4/2017 | Koezuka et al. |
| 2019/0251911 A1* | 8/2019 | Ho .......................... G02F 1/167 |
| 2020/0089035 A1* | 3/2020 | Tsai ...................... H01L 27/124 |
| 2021/0247656 A1* | 8/2021 | Murari .................... G02F 1/167 |

FOREIGN PATENT DOCUMENTS

| | | |
|---|---|---|
| WO | 2000005704 A1 | 2/2000 |
| WO | 2000038000 A1 | 6/2000 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Korean Intellectual Property Office, "International Search Report and Written Opinion", PCT/US2021/035103, dated Sep. 9, 2021.

* cited by examiner

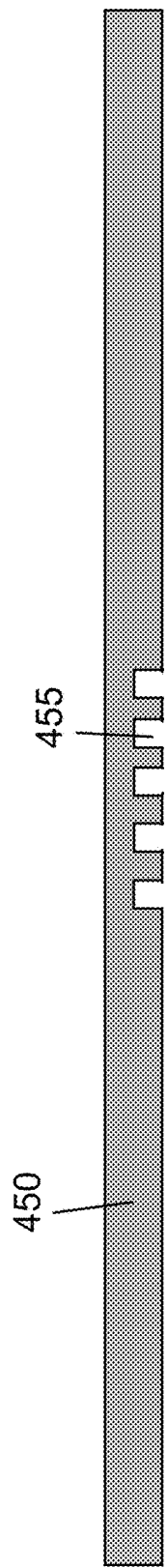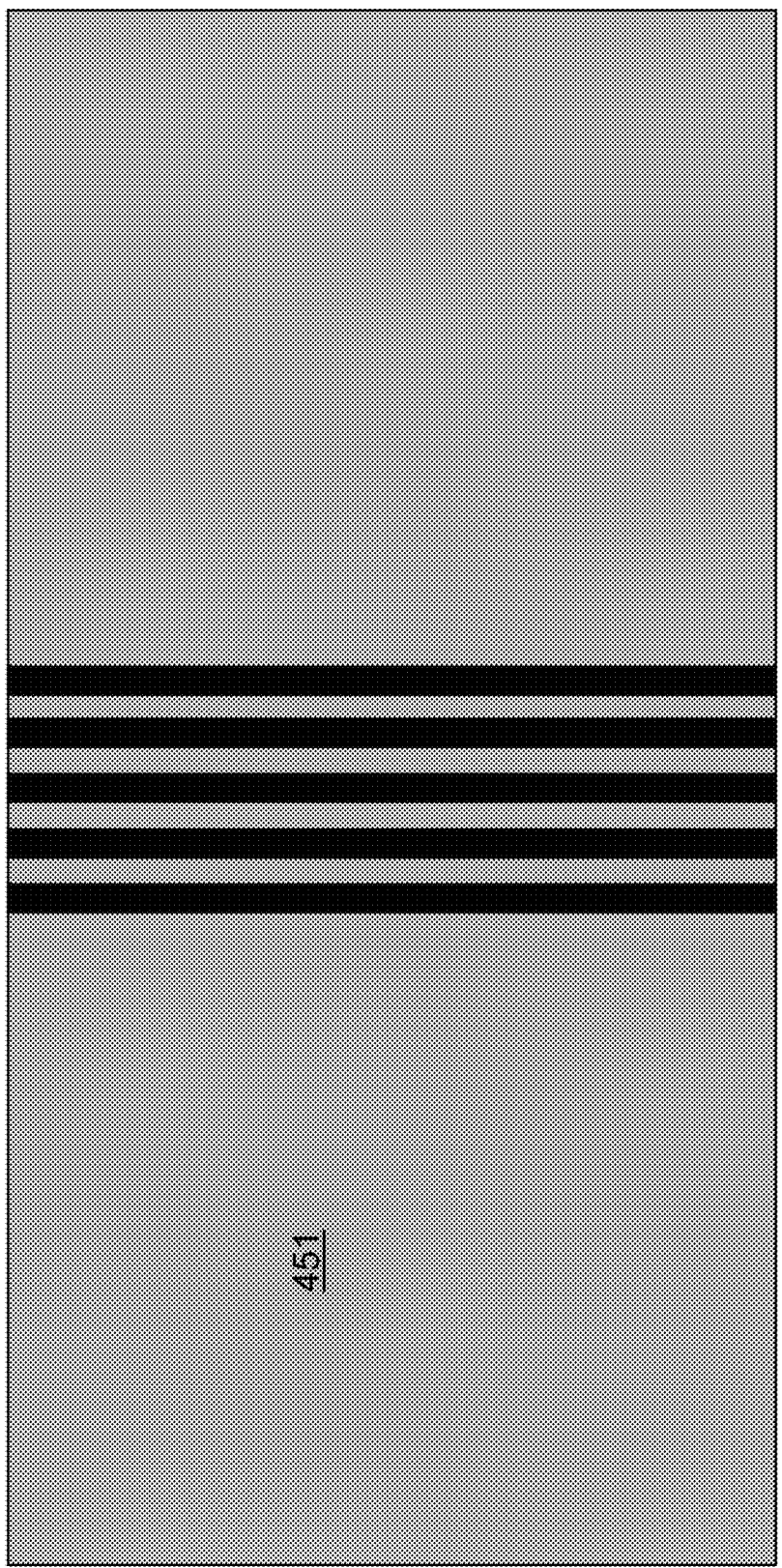

FOLDABLE ELECTROPHORETIC DISPLAY MODULE INCLUDING NON-CONDUCTIVE SUPPORT PLATE

RELATED APPLICATIONS

This application is a continuation of U.S. patent application Ser. No. 17/335,218, filed Jun. 1, 2021, now U.S. Pat. No. 11,513,415B2, which claims priority to U.S. Provisional Patent Application No. 63/033,954, filed Jun. 3, 2020, which is incorporated by reference in its entirety. All patents and publications disclosed herein are incorporated by reference in their entireties.

FIELD OF THE INVENTION

This invention relates to foldable electrophoretic displays, the formation of such displays, and component modules for the manufacture of foldable electrophoretic displays. Integrated foldable electrophoretic display modules can be fabricated in one location and then shipped to a different manufacturing facility where different components, providing different functionality, can be incorporated into the final foldable display. Such differing functionality may include, e.g., different types of front lights, different types of touch sensing, or different types of stylus recognition, depending upon the needs of the consumer and the desired price point.

BACKGROUND OF INVENTION

In some instances, a flexible display may be folded for portability and/or convenience of storage. If the display was simply folded in a book like fashion, it may be folded with a radius of curvature that is smaller than a minimum radius of curvature designed to prevent display breakage. To prevent such problem, various mechanisms, such as hinges and/or other structures, have been implemented to the bending portions of the display. For example, Polymer Vision has disclosed a product Readius™ using one or more mechanical hinge mechanisms to facilitate the folding of the flexible display.

In another example, Japanese Patent Laid-Open Publication No. 2014-161009 discloses a flexible mobile terminal device configured to bend at various angles. The terminal device is proposed to include a folding portion for bending the device to a front surface or a rear upper position of a terminal device body. A flexible display mounted on an upper portion of the terminal device body can be bend to the front surface or a rear surface depending on a bending direction of the folding portion. The device further includes a sliding portion for causing one end of the flexible display to slide by a difference between degrees of compression/tension generated by a difference in extension rates of the folding portion and the flexible display during bending of the folding portion.

Both examples described above result in thick and heavy products. The Readies™ by Polymer Vision employs mechanical hinge mechanisms that are complex in structure and bulky in shape. The device of Japanese Patent Laid-Open Publication No. 2014-161009 has a bellows shape and the sliding portion takes labor to adjust, and the device is also complex and bulky.

In addition to being bulky and thick, an additional shortcoming of the devices described above is that such designs make it difficult to integrate all of the functionality that consumers expect in a premium electrophoretic display device, such as touch sensing, front light, stylus recognition, and color.

SUMMARY OF INVENTION

In response to these needs, the disclosure describes a foldable electrophoretic display module and a variety of foldable electrophoretic displays that incorporate the foldable electrophoretic display module and provide a variety of sensing functionality. In a first aspect, the invention includes an electrophoretic display module, including a support plate having material voids in a central folding zone, a layer of low-modulus adhesive adjacent the support plate, a flexible backplane that spans the central folding zone and is adjacent the layer of low-modulus adhesive, a layer of electrophoretic display media adjacent the flexible backplane, and a conductive integrated barrier layer including a light-transmissive electrode and a moisture barrier. In some embodiments, the electrophoretic display module additionally includes a protection layer between the layer of low-modulus adhesive and the flexible backplane. In some embodiments, the flexible backplane comprises an active matrix of organic-thin-film-transistors. In some embodiments, the electrophoretic display module additionally includes an edge seal coupled to the flexible backplane, the layer of electrophoretic display media, and the conductive integrated barrier. In some embodiments, the layer of electrophoretic display media is contained in a layer of microcells. In some embodiments, the layer of electrophoretic display media is contained in microcapsules and the microcapsules are held in place by a polymer binder. In some embodiments, the electrophoretic display module additionally includes a protective sheet adjacent the conductive integrated barrier. In some embodiments, the electrophoretic display module additionally includes an edge seal coupled to the flexible backplane, the layer of electrophoretic display media, the conductive integrated barrier, and the protective sheet. In some embodiments, the support plate comprises a non-conductive polymer. In some embodiments, the support plate is between 250 µm and 50 µm in thickness.

In a second aspect, the invention includes a foldable electrophoretic display configured to interact with a stylus, the foldable display including a support plate having material voids in a central folding zone, a layer of low-modulus adhesive adjacent the support plate, a flexible backplane that spans the central folding zone and is adjacent the layer of low-modulus adhesive, a layer of electrophoretic display media adjacent the flexible backplane, and a conductive integrated barrier layer including a light-transmissive electrode and a moisture barrier, a protective sheet coupled to the conductive integrated barrier, an electromagnetic resonance (EMR) sensor layer adjacent to the support plate, a foldable chassis adjacent to the EMR sensor layer, and a housing surrounding the foldable chassis and providing a bezel contacting the protective sheet, and allowing a user to view the electrophoretic display medium through the protective sheet. In some embodiments, the foldable electrophoretic display additionally includes an intermediate layer of a low-modulus adhesive disposed between the EMR sensor layer and the support plate. In some embodiments, the foldable electrophoretic display additionally includes an intermediate layer of a high-modulus adhesive disposed between the EMR sensor layer and the support plate. In some embodiments, the intermediate layer of a low-modulus adhesive and the intermediate layer of a high-modulus adhesive do not span the central folding zone. In some embodiments, the foldable electrophoretic display additionally includes a touch sensitive layer disposed between the EMR sensor layer and the foldable chassis. In some embodiments, the foldable electrophoretic display additionally includes an intermediate layer of a low-modulus adhesive disposed between the touch sensitive layer and the foldable chassis. In some embodiments, the foldable electrophoretic display additionally includes an intermediate layer of a high-modulus adhesive disposed between the touch sensitive layer and the foldable chassis. In some embodiments, the intermediate layer of a low-modulus adhesive and the intermediate layer of a high-modulus adhesive do not span the central folding zone. In some embodiments, the conductive integrated barrier additionally comprises a color filter array (CFA).

In a third aspect a foldable electrophoretic display configured to interact with a stylus, including a support plate having material voids in a central folding zone, a layer of low-modulus adhesive adjacent the support plate, a flexible backplane that spans the central folding zone and is adjacent the layer of low-modulus adhesive, a layer of electrophoretic display media adjacent the flexible backplane, and a conductive integrated barrier layer including a light-transmissive electrode and a moisture barrier, a flexible front light plate coupled to the conductive integrated barrier, a flexible capacitive touch layer adjacent to the flexible front light plate, a protective sheet adjacent to the flexible capacitive touch layer, a foldable chassis adjacent to the support plate and a housing surrounding the foldable chassis and providing a bezel contacting the protective sheet, and allowing a user to view the electrophoretic display medium through the protective sheet. In some embodiments, the foldable electrophoretic display additionally includes an intermediate layer of a low-modulus adhesive disposed between the foldable chassis and the support plate. In some embodiments, the foldable electrophoretic display additionally includes an intermediate layer of a high-modulus adhesive disposed between the foldable chassis and the support plate. In some embodiments, the intermediate layer of a low-modulus adhesive and the intermediate layer of a high-modulus adhesive do not span the central folding zone. In some embodiments, the conductive integrated barrier additionally comprises a color filter array (CFA).

BRIEF DESCRIPTION OF DRAWINGS

FIG. 4A shows a side view of an embodiment of a support plate having material voids in a central folding zone.

FIG. 4B shows a top view of an embodiment of a support plate having material voids in a central folding zone.

DETAILED DESCRIPTION

Figure 1A:
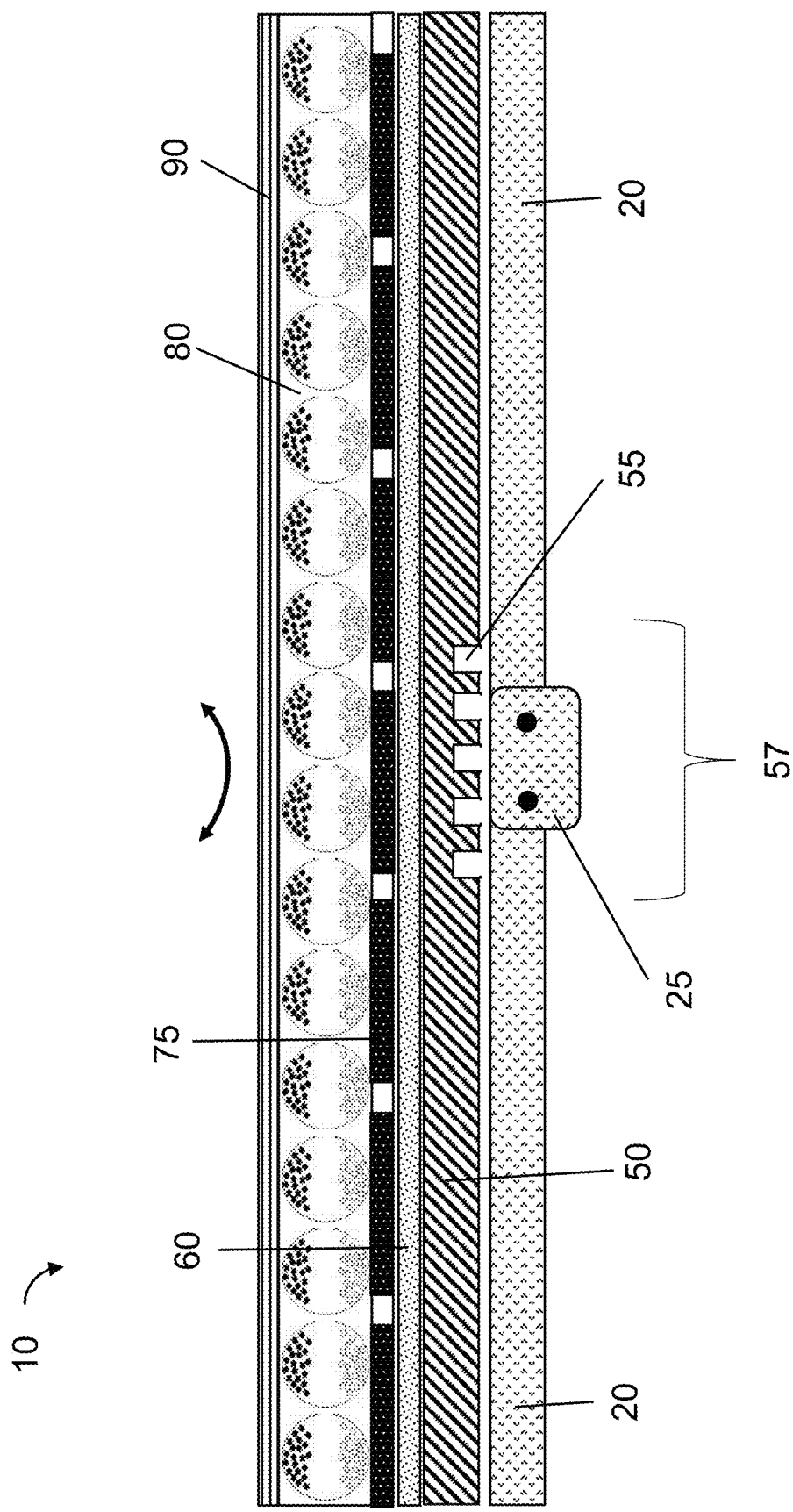
FIG. 1A shows an embodiment of a foldable electrophoretic display including a support plate having material voids in a central folding zone.

As indicated above, the present invention provides an electrophoretic display that is flexible and may be folded in a book-like fashion and modules for use in the production of making such foldable displays. The design is thin and lightweight, and because the support plate is non-conductive, it is possible to situate the support plate between the electrophoretic display layer and an electromagnetic resonance sensing device.

The invention is well suited to be used with electrophoretic media of the type developed by E Ink Corporation (Billerica, MA) and described in the patents and patent publications listed below. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include: (a) Electrophoretic particles, fluids and fluid additives; see for example U.S. Pat. Nos. 7,002,728 and 7,679,814; (b) Capsules, binders and encapsulation processes; see for example U.S. Pat. Nos. 6,922,276 and 7,411,719; (c) Microcell structures, wall materials, and methods of forming microcells; see for example U.S. Pat. Nos. 7,072,095 and 9,279,906; (d) Methods for filling and sealing microcells; see for example U.S. Pat. Nos. 7,144,942 and 7,715,088; (e) Films and sub-assemblies containing electro-optic materials; see for example U.S. Pat. Nos. 6,982,178 and 7,839,564; (f) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750; 473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605; 799; 7,636,191; 7,649,674; 7,667,886; 7,672,040; 7,688,497;

7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 201.5/0356927; 2015/0378235; 2016/077375; 2016/0103380; and 2016/0187759; and International Application Publication No. WO 00/38000; European Patents Nos. 1,099,207 B1 and 1,145,072 B1, (g) Color formation and color adjustment; see for example U.S. Pat. Nos. 7,075,502 and 7,839,564; and (h) Methods for driving displays; see for example U.S. Pat. Nos. 7,012,600 and 7,453,445. All of the patents and patent applications listed herein are incorporated by reference in their entirety. Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

While the invention is primarily directed to electrophoretic media of the type described above and in the listed patents and patent applications, other types of electro-optic materials may also be used in the present invention. The alternative electro-optic media are typically reflective in nature, that is, they rely on ambient lighting for illumination instead of a backlight source, as found in an emissive LCD display. Alternative electro-optic media include rotating bichromal member type media as described, for example, in U.S. Pat. Nos. 5,808,783; 5,777,782; 5,760,761; 6,054,071 6,055,091; 6,097,531; 6,128,124; 6,137,467; and 6,147,791. Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another alternative electro-optic display medium is electrochromic, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

An exemplary foldable electrophoretic display (FEPID) is show in FIG. 1A. Foldable display 10 normally comprises a layer of electrophoretic display media 80 and at least two other electrically-conductive layers, such as flexible backplane 75 and conductive integrated barrier layer 90 disposed on opposed sides of the layer of electrophoretic display media 80. The stack of conductive layers and the layer of electrophoretic display media 80 are disposed on a support plate 50 having material voids 55 in a central folding zone 57. Typically, the flexible backplane 75 is coupled to the support plate 50 with a low-modulus adhesive 60, which provides good adhesion between the layers so that the display surface remains flat when opened, but also allows enough lateral slippage so that the flexible backplane 75 can move slightly with respect to the support plate 50 as the FEPID is opened and closed. Suitable low-modulus adhesives 60 may include adhesive foam polymers from 3M (Minneapolis, Minnesota) and CGR Products (Greensboro, NC). The low-modulus adhesives may comprise polyurethanes, polyacrylates, and/or silicones. Exemplary low-modulus adhesives may be known as PORON®, which is a registered trademark of Rogers Corporation, or DOWSIL®, which is a registered trademark of Dow Chemical Corporation. In some instances, the low-modulus adhesives 60 provide compressive resistance between the support plate 50 and the flexible backplane 75. While FIG. 1A depicts a layer of low-modulus adhesive 60 that spans the central folding zone 57, it is also possible for the layer of low-modulus adhesive 60 to be interrupted in the central folding zone 57, thereby providing more room for flexure of the portion of the support plate 50 having material voids 55, i.e., in the central folding zone 57. The low-modulus adhesive layer typically is between 500 μm and 50 μm in thickness, for example, between 300 μm and 100 μm in thickness.

While the support plate 50, alone, provides sufficient rigidity for a foldable display 10, a foldable display 10 typically additionally includes a chassis 20 that is coupled by a hinge 25 to provide mechanical shock protection in addition to protecting the support plate from being extended past flat (i.e., past 180° of opening) at which point the flexible backplane 75 may fail because the flexible traces (not shown) in the flexible backplane 75 are stretched to a point that they break. The structure of the chassis may include a two-part chassis, as shown in FIG. 1A, however the chassis may include a three-part system whereby a central "spine" region is coupled to two different leafs with two different hinges, or a complex hinge that spans the three portions. Thus with the stack-up shown in FIG. 1A, a lightweight electrophoretic display 10 is produced that can fold between flat (as shown) and closed, like a normal book.

In the instance of FIG. 1A, the top conductive layer has been incorporated into a conductive integrated barrier layer 90, including a light-transmissive conductive material and a flexible moisture barrier. For example, the conductive integrated barrier layer 90 may include a sputtered conductive material that transmits visible light, such as indium-tin-oxide (ITO), or the conductive integrated barrier layer 90 may include conductive filaments, nanowires, or nanotubes, thereby providing the needed combination of electrical conductivity, light-transmission, and flexibility. Alternatively, the conductive integrated barrier layer 90 may incorporate one of more light-transmissive conductive polymers, such as poly(3,41-ethylenedioxythiophene) (PEDOT), which may be solubilized with the addition of polystyrene sulfonate. The conductive integrated barrier layer 90 typically also includes a moisture blocking material, such as waterproof materials such as inorganic ceramics, organic polymers or organic/inorganic composites. The inorganic ceramics, for example, include silicon oxide (SiOx) or silicon nitride (SiNx). The organic polymers, for example, include parylene or polypropylene, or polyethylene terephthalate (PET). The organic/inorganic composites, for example, include amorphous silicon/parylene composite, or polypropylene/polyacrylate/aluminum composite. In some embodiments, the conductive integrated barrier layer 90 may also include an integrated color filter array (CFA), e.g., of the type described in U.S. Pat. No. 10,209,556, which is incorporated by reference herein in its entirety. Alternative constructions of color filter arrays incorporated into the conductive integrated barrier layer 90 are also possible, for example, using stacked thin colored films, offset printing, or lithographic priming. CFAs for such devices may include four colored subpixels, such as red, green, blue, and clear (white), three colored subpixels, such as red, green, and blue, or stripes running top to bottom, left to right, or diagonal. Combinations of subpixels and stripes are possible, and the color sets are not limited to red, green, and blue, as other suitable color sets are available, provided the combination of colors provides an acceptable palette of colors to reproduce color images.

In foldable displays 10, the flexible backplane 75 includes a plurality of driving electrodes on a flexible substrate. In FEPIDs the electrical driving waveforms are transmitted to the flexible backplane 75, which typically includes pixel electrodes, via flexible conductive traces (not shown) that are coupled to thin-film transistors (TFTs) that allow the pixel electrodes to be addressed in a row-column addressing scheme. In other embodiments, the pixel electrodes of the flexible backplane 75 may be directly driven, that is, each pixel is directly turned on and off by a driver circuit. In some embodiments, the conductive integrated barrier layer 90 is merely grounded and the image driven by providing positive and negative potentials to the flexible backplane pixel electrodes, which are individually addressable. In other embodiments, a potential may also be applied to the conductive integrated barrier layer 90 to provide a greater variation in the fields that can be provided between the conductive integrated barrier layer 90 and the flexible backplane 75. Active matrix flexible backplanes suitable for use in the invention are available from, e.g., FlexEnable (Cambridge, UK) and other suppliers. Flexible active matrix backplanes typically use thin films of conductive organic materials to create flexible thin-film transistors. More details on suitable flexible backplanes and backplane components can be found in U.S. Pat. Nos. 7,223,672, 7,902,547, and 8,431,941, which are incorporated herein by reference in their entireties.

In many embodiments, the flexible backplane 75 will include an active matrix for image driving. In an active matrix arrangement, each pixel electrode is coupled to a thin-film transistor patterned into an array, and connected to elongate row electrodes and elongate column electrodes, running at right angles to the row electrodes, in some embodiments, the pixels comprise transistors fabricated from metal oxides or conductive polymeric material. In some embodiments, the pixels are flexible. In some embodiments, the pixels are rigid, but because the substrate and the traces between the pixels are flexible, the backplane can flex sufficiently to create a flexible backplane. Typically, a data driver is connected to the column electrodes and provides source voltage to all TFTs in a column that are to be addressed. In addition, a scanning driver is connected to the row electrodes to provide a bias voltage that will open (or close) the gates of each TFT along the row. The gate scanning rate is typically ~60-100 Hz. It is understood that the assignment of "row" and "column" electrodes is somewhat arbitrary and that a TFT array could be fabricated with the roles of the row and column electrodes interchanged. In some embodiments, the TFT array is substantially flexible, however individual components, such as individual pixel transistors or driver circuits may not be flexible. The flexible traces for supply voltages to the individual pixels may be formed from flexible materials, such as conductive polymers, or polymers doped with conductive materials such as metal particles, nanoparticles, nanowires, nanotubes, graphite, and graphene.

Figure 1B:
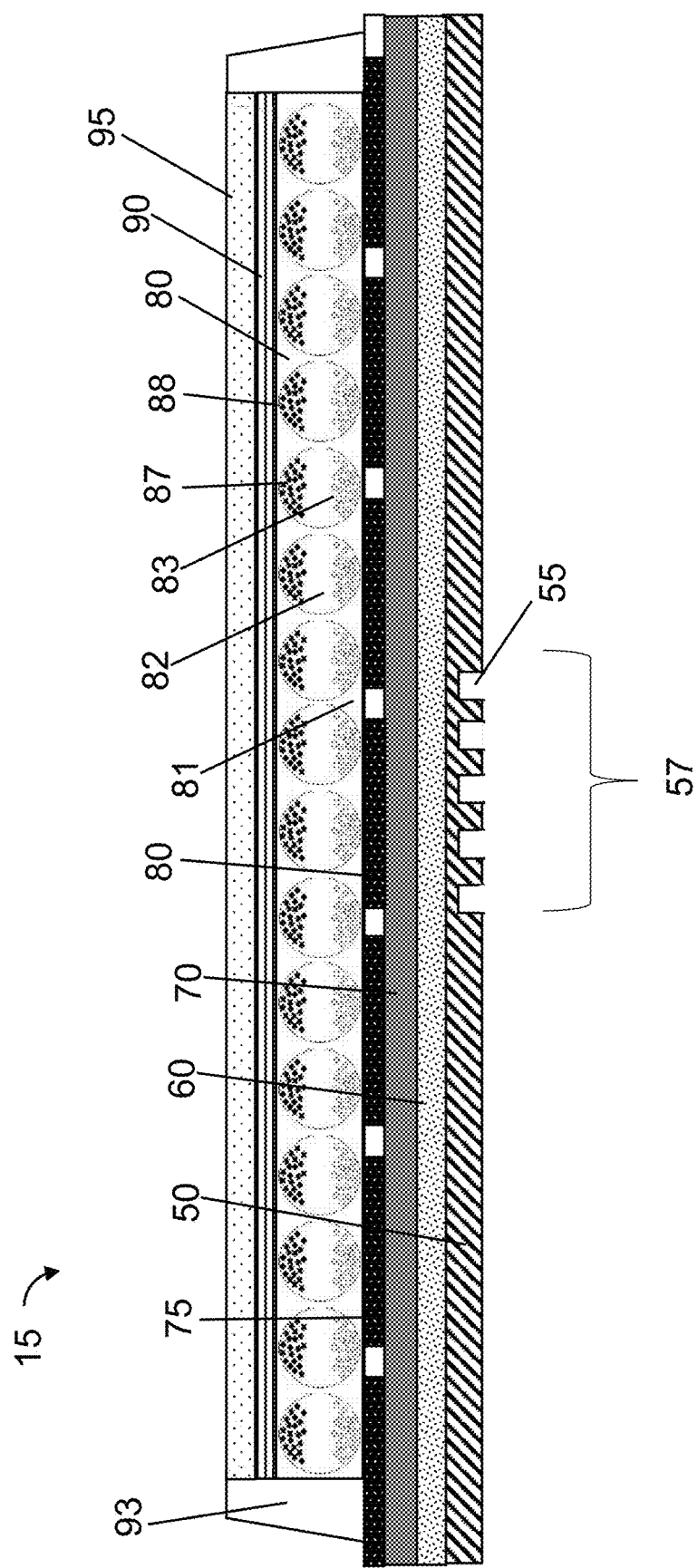
FIG. 1B shows an embodiment of a module for a foldable electrophoretic display including a support plate having material voids in a central folding zone.

The invention additionally includes a foldable electrophoretic display module 15, as shown in FIG. 1B. Such a foldable display module 15 can be manufactured as a stand-alone foldable electrophoretic display component, whereby it can be shipped to various manufacturers who can integrate the module 15 into a foldable electrophoretic display, e.g., of the type described below with respect to FIGS. 2A, 2B, and 3. A foldable display module 15 is typically conditioned and sealed before shipment so that it can be laminated to additional components, e.g., a front light or capacitive touch sensor or an electromagnetic resonance sensing layer, both of which are discussed below. To maintain the integrity of the module 15, the module typically includes an edge seal 93 or the type that is typical with electrophoretic displays. For a greater description of EPID edge seals, see U.S. Pat. No. 7,554,712, which is incorporated herein by reference in its entirety.

A flexible display module 15 includes the support plate 50 having material voids 55 in a central folding zone 57, a layer of low-modulus adhesive 60, a flexible backplane 75 that spans the central folding zone 57, a layer of electrophoretic display media 80, and a conductive integrated barrier layer 90, which includes the features of both a light-transmissive electrode and a moisture barrier. As shown in more detail in FIG. 1B, the layer of electrophoretic display media 80 may include microcapsules 88, holding electrophoretic pigment particles 83 and 87 and a solvent 82, with the microcapsules 88 dispersed in a polymeric binder 81. Nonetheless, it is understood that the electrophoretic medium (particles 83 and 87 and solvent 82) may be enclosed in microcells (microcups) or distributed in a polymer without a surrounding microcapsule PDEPID design described above). Typically, the pigment particles 83 and 87 are controlled (displaced) with an electric field produced between the conductive integrate barrier layer 90 and the flexible backplane 75. A module of the invention may additionally include a top protective sheet 95, which may be a hardened transparent anti-glare covering made from a polymer, such as a polyacrylate or a polyimide. The top protective sheet 95 may be integrated into the edge seal 93, or the top protective sheet 95 may actually envelope the edge seal to provide an extra degree of environmental protection for the electrophoretic display layer 80 and the flexible backplane 75. In some instances a module 15 will additionally include a protection layer 70 between the low-modulus adhesive 60 and the flexible backplane 75 to prevent ingress of the low-modulus adhesive into the flexible backplane 75 materials. The protection layer 70 may be a thin polymer layer, such as polyethylene terephthalate, or the protection layer 70 may be a flexible dielectric layer applied to the "back" of the flexible backplane 75, such as parylene.

While EPID media are described as "black/white," they are typically driven to a plurality of different states between black and white to achieve various tones or "greyscale." Additionally, a given pixel may be driven between first and second grayscale states (which include the endpoints of white and black) by driving the pixel through a transition from an initial gray level to a final gray level (which may or may not be different from the initial gray level). The term "waveform" will be used to denote the entire voltage against time curve used to effect the transition from one specific initial gray level to a specific final gray level. Typically, such a waveform will comprise a plurality of waveform elements; where these elements are essentially rectangular (i.e., where a given element comprises application of a constant voltage for a period of time); the elements may be called "pulses" or "drive pulses." The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible to use more than one drive scheme simultaneously in different areas of the same display, and a set of drive schemes used in this manner may be referred to as "a set of simultaneous drive schemes."

Foldable Electrophoretic Display Including Touch Sensing and Digitization Layer

Figure 2A:
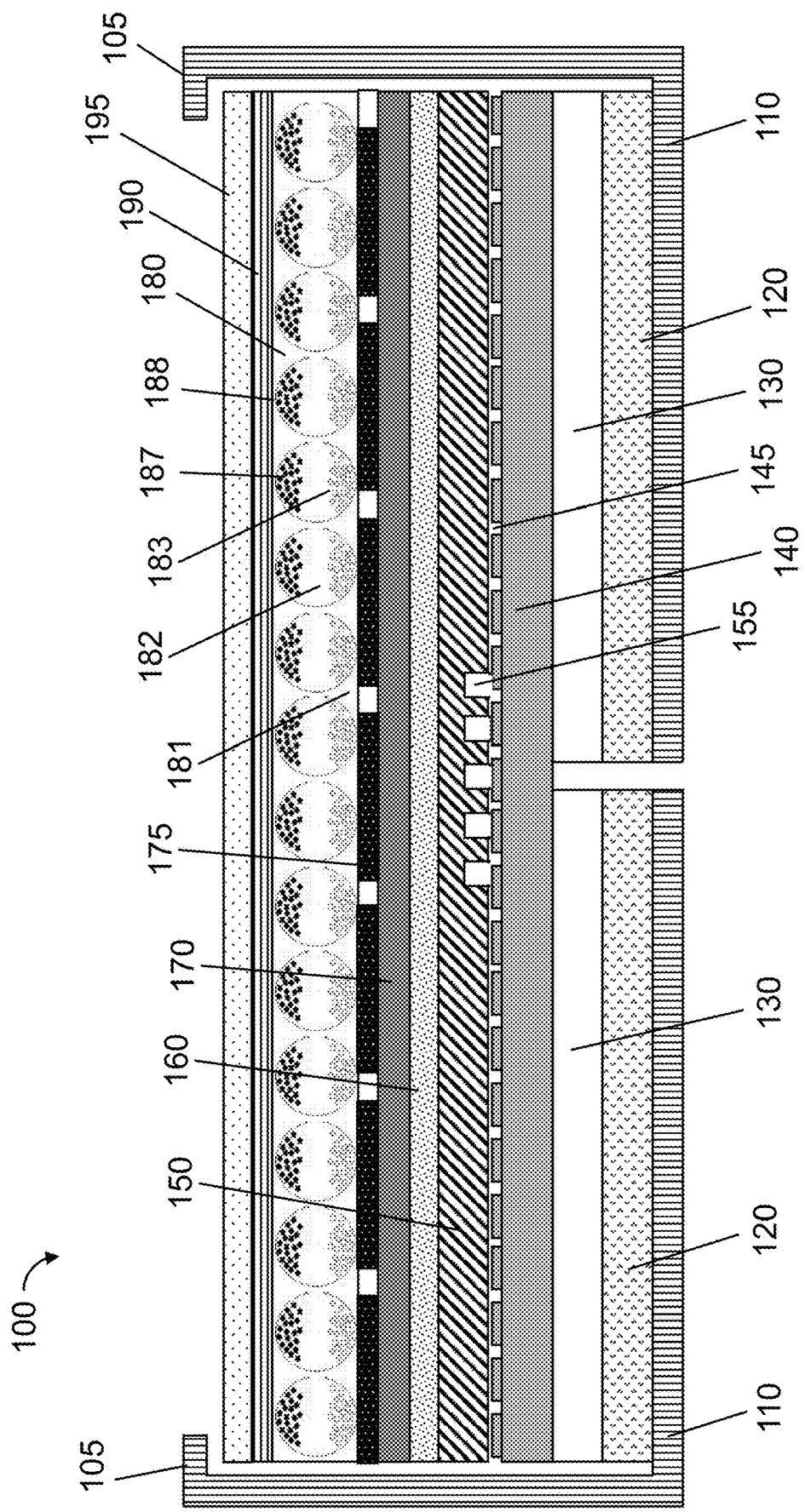
FIG. 2A shows an embodiment of a foldable electrophoretic display including a support plate having material voids in a central folding zone. The foldable electrophoretic display of FIG. 2A includes an electromagnetic resonance (FAIR) sensing layer to enable sensing of a stylus.
Figure 2B:
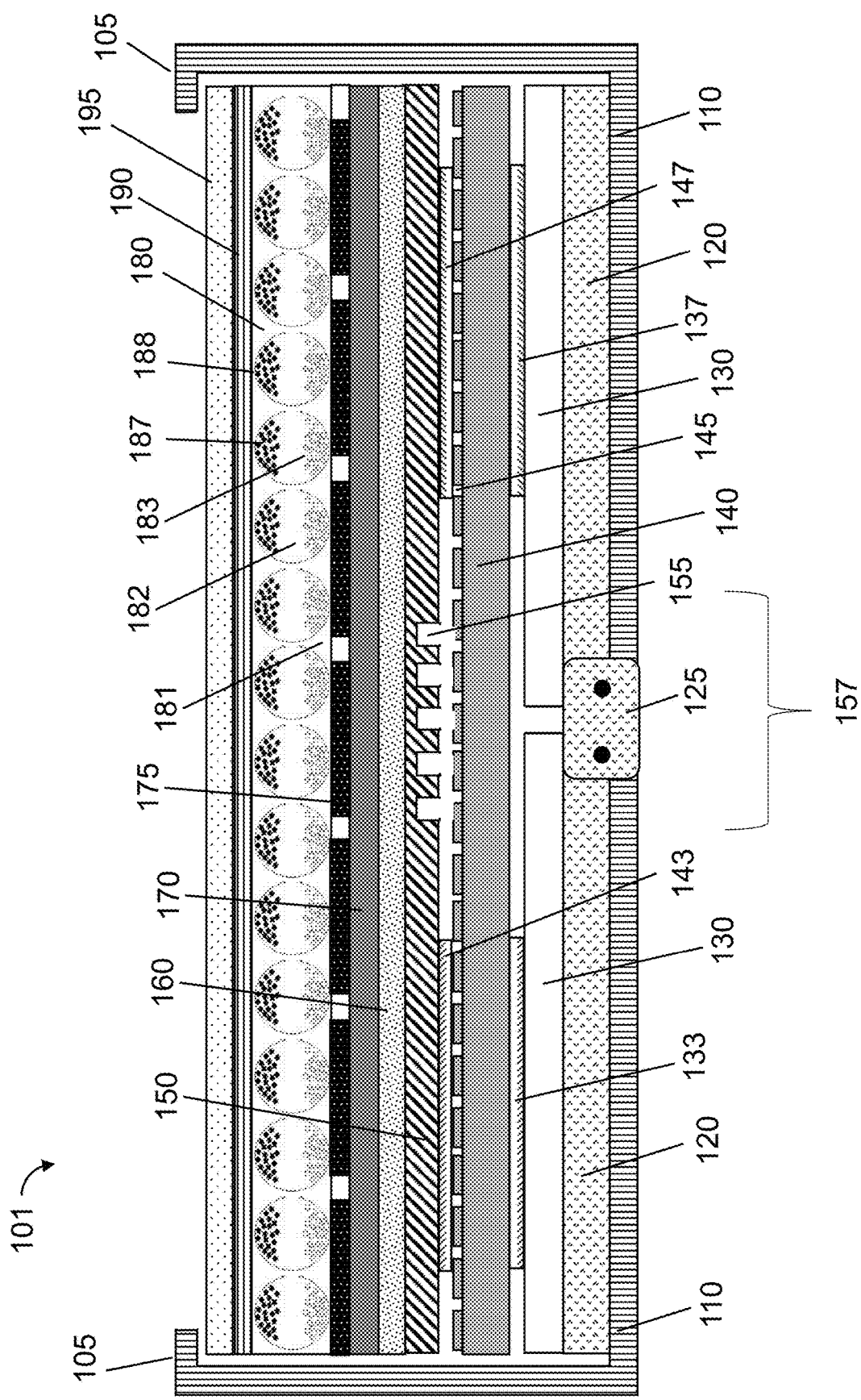
FIG. 2B shows an embodiment of a foldable electrophoretic display including a support plate having material voids in a central folding zone. The foldable electrophoretic display of FIG. 2B includes an electromagnetic resonance (EMR) sensing layer to enable sensing of a stylus. One side of the electrophoretic display of FIG. 2B includes low-modulus adhesive layers while the other side of the electrophoretic display of FIG. 2B includes high-modulus adhesive layers. Accordingly, one side of the display stack is able to move laterally as the display is folded.

An advanced embodiment of a foldable electrophoretic display (FEND) using a design of the invention is shown in FIG. 2A and FIG. 2B. The FEPID 100 roughly resembles a foldable version of a premium two panel electrophoretic tablet, of the type sold by GVIDO Music Co., LTD. (Tokyo, Japan) as a digital ePaper music score. However, the instant invention allows the folding region to be active, making the reading and writing experience continuous across the spine. The FEND 100 design shown in FIGS. 2A and 2B need not be as large as two full A4 sheets, and may be the size of a singular A4 sheet when opened flat, and providing two panes of approximately 100 mm×150 mm when held partially opened as a book. The FEPID 100 may include all of the functionality that is currently expected in such a device including WWI communication, BLUETOOTH, a color adjusting front-light, stylus recognition and writing reproduction, touch sensing, and color. The color electrophoretic display may include a color filter array used with conventional black and white ink, or the color electrophoretic display may incorporate advanced electrophoretic display technology from E Ink Corporation, such as Advanced Color e Paper (ACEP™) or E Ink Spectra™. Details of ACeP™ and E Ink Spectra™ can be found at U.S. Pat. Nos. 9,921, 451 and 10,032,419, which are incorporated by reference herein in their entireties.

Returning to FIG. 2A, the foldable electrophoretic display (FEPID) 100 includes a housing 110 extending around the backside of the display 100, with a break in the middle allowing the display 100 to fold like a book. The housing 110 covers a chassis 120 including two plates that provide shock resistance for the display 100 and prevent back-bending, as described previously with respect to FIG. 1A. The housing may be a durable polymer, such as nylon, or it may be a "finished" material such as wood or leather. While not shown in FIG. 1A, the housing 110 may also be integrated into the chassis 120, and optionally coupled to a hinge (not shown) that provides a radius about which the chassis 120 folds. The housing 110 wraps around the display and finishes with a bezel 105, which may be above or flush with the top surface of the display 100. In the instance of FIG. 1A, the bezel 105 is above the top protective sheet 195, which may be a hardened transparent anti-glare covering made from a polymer, such as a polyacrylate or a polyimide.

The embodiment shown in FIG. 2A includes two pressure touch sensor layers 130, above each of the chassis plates 120. Because of the use of a thin support plate 150 with material voids 155, and a low-modulus adhesive 160 between the flexible backplane 175 and the support plate 150, there is sufficient compressive force by a user pushing on the protective sheet 195 with a finger for the pressure touch sensor layers 130 to be activated. Such pressure-sensitive layers may include micro-deformable piezoresistive sensors, which are quite thin and are commercially available from Uneo Inc. (New Taipei City, Taiwan). Alternative thin, touch sensitive technology, such as QTC force-sensing technology pioneered by Peratech (Richmond, United Kingdom) may also be used for the pressure touch sensor layers 130.

The display 100, of FIG. 2A additionally incorporates a flexible electromagnetic resonance (EMR) sensor layer 140 to sense an active stylus, which can be used for e.g., handwriting capture, sketching, mark-up, or manipulating objects on the display. Flexible EMR layers 140 may include stacked loops of wires in a flexible medium, thereby allowing proximity sensing of an active or a passive stylus. Suitable styluses are available from, e.g., Wacom (Kazo, Japan). The EMR layer 140 may be a single contiguous unit, or it may be a collection of individual EMR layers 140. In an alternative embodiment, not shown in FIG. 2A, the EMR layer 140 may include two separate semi-rigid EMR layers of the type commercially available from Wacom, with a smaller area of a specialty flexible EMR that spans the central folding zone (similar to central folding zone 157 of FIG. 2B). In some embodiments, one or both surfaces of the flexible EMR layer 140 will be rough, or have a roughened surface 145, to help the EMR layer stay relatively flat and only move side to side, rather than up and down, in the view of FIG. 2A.

In the middle of the foldable display 100 is the support plate 150 having material voids 155 in a central folding zone. As discussed in greater detail with respect to FIGS. 4A, 4B, 5A, and 5B, the support plate can be made from a variety of materials, such as polymers, metal, e.g., stainless steel, carbon fiber, or wood veneers. In the embodiment of FIG. 2A, the support plate 150 comprises a non-conductive polymer, such as polyethylene terephthalate, which does not interfere with electromagnetic resonance position sensing between flexible EMR layer 140 and a stylus used on the top surface of the display 100. The support plate is typically between 250 µm and 50 µm in thickness. The central folding zone for the support plate 150 is not specifically marked in FIG. 2A for simplicity, but it is roughly the area where the voids 155 have been removed from the support plate 150. The central folding zone may be less than 20% of the total surface area of the support plate 150, e.g., less than 10% of the total surface area of the support plate 150, e.g., less than 5% of the total surface area of the support plate 150.

As discussed above, a low-modulus adhesive layer 160 is disposed between the support plate 150 and the flexible backplane 175. Finally, in some embodiments, a protection layer 170 may be disposed between the flexible backplane 175 and the low-modulus adhesive layer 160 to protect the flexible backplane 175 from corrosion or electrical malfunction due to contact with the low-modulus adhesive layer 160, which may include conductive material or solvents that may attack the flexible backplane 175. However, with the choice of suitable low-modulus adhesive layer 160, it may be unnecessary to include protection layer 170. (Elements 180, 181, 182, 183, 187, 188, and 190 are the electrophoretic display layer 80, the polymer binder 81, the electrophoretic medium solvent 82, the first particle set 83, the second particle set 87, the capsule wall 88, and the conductive integrated barrier layer 90, as described above with respect to FIG. 1B.)

In a commercial application, it is likely that additional components will be present in a foldable electrophoretic display (FEND) 101, when the FEND includes EMR sensing layer 140 and the pressure touch sensor layers 130, as shown in FIG. 2B. Firstly, as discussed with respect to FIG. 1B, it is likely that a hinge 125 will be included to facilitate opening and closing of the two plates of the chassis 130. The hinge 125 is merely exemplary and a variety of alternative hinges may be used. Additionally, it is typical that one or more additional layers of low-modulus adhesive will be added between the various layers of the FEPID display 101 to help the display 101 to retain a smooth shape despite repeated opening and folding. For example, a first intermediate low-modulus adhesive layer 133 may be disposed between the pressure touch sensor layer 130 and the flexible EMR layer 140. A second intermediate low-modulus adhesive layer 143 may be disposed between the flexible EMR layer 140 and the support plate 150. Notably, the first and second intermediate low-modulus adhesive layers need not span the entire width of the display, i.e., from the left side to the right side in FIG. 2B. This partial disposition of low-modulus adhesive will provide greater void space during the folding process, resulting in less pressure on the electrophoretic display layer 180 at the fold, and reducing the likelihood of failure or delamination with multiple folds. In addition to low-modulus adhesive layers 143 and 147, high-modulus adhesives, such as polyurethanes or polyacrylates may be used on the opposing side of the FEPID 101 to assure that the layers of the display 101 are locked together and that most of the lateral movement takes place on one side of the display, while the other side stays firm. That is, a first intermediate high-modulus adhesive layer 137 may be disposed between the pressure touch sensor layer 130 and the flexible EMR layer 140, while a second intermediate high-modulus adhesive layer 147 may be disposed between the flexible EMR layer 140 and the support plate 150. The high-modulus adhesives help the alignment of the various layers to be maintained throughout repeated opening and closing cycles.

Figure 3:
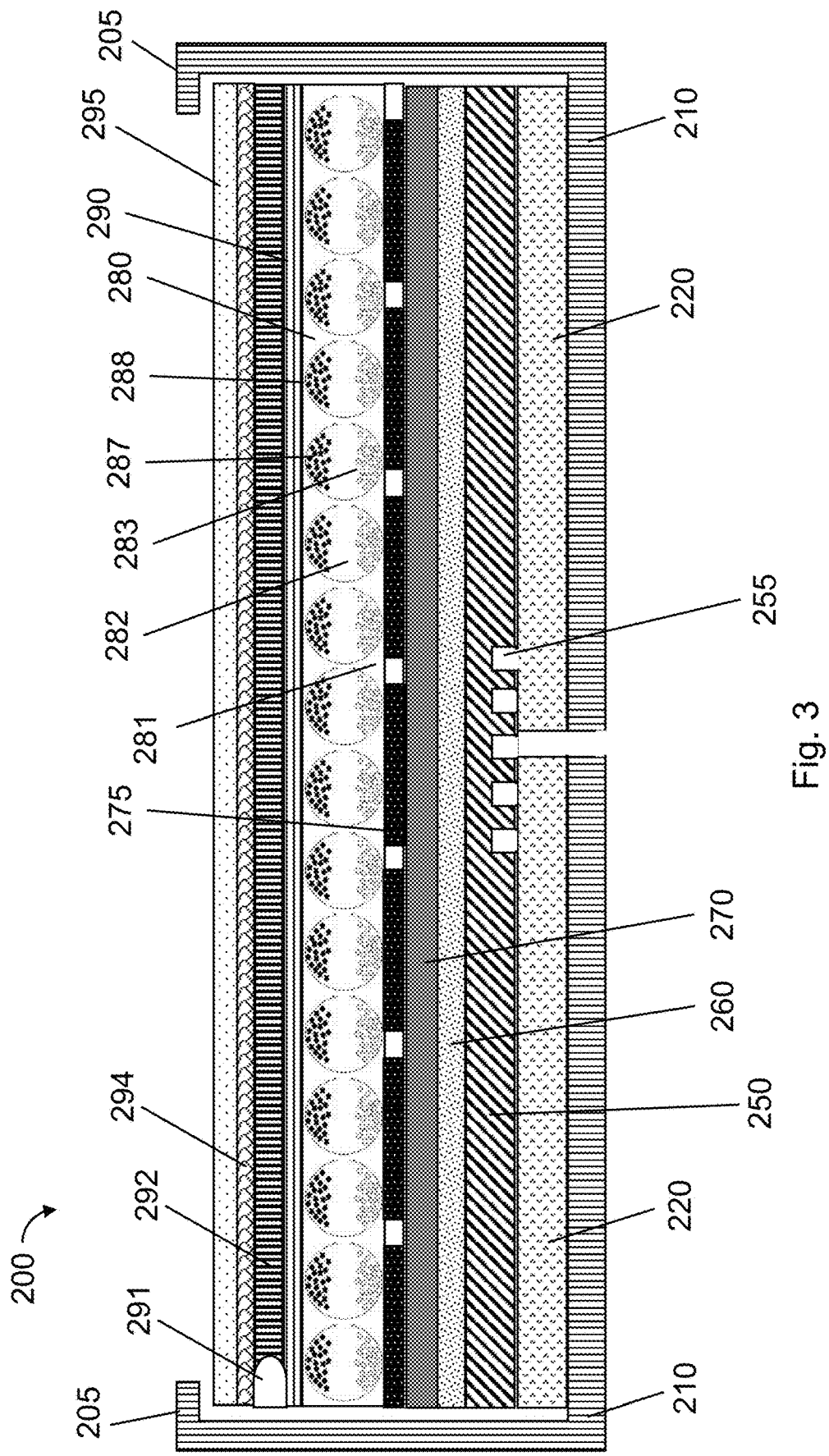
FIG. 3 shows an embodiment of a foldable electrophoretic display including a support plate having material voids in a central folding zone. The foldable electrophoretic display of FIG. 3 includes a capacitive touch-sensing layer as well as a front light.

Foldable Electrophoretic Display Including a Front Light and Capacitive Touch Sensing A foldable electrophoretic display (FEND) 200 including a capacitive touch sensing layer 294, a front light plate 292, and a light source 291 is illustrated in FIG. 3. Many of the component parts of FEPID 200 are the same as FEPID 100 described with respect to FIG. 2A. FEPID 200 includes a housing 210 extending around the backside of the display 200, with a break in the middle allowing the display 200 to fold like a book. The housing 210 covers a chassis 220 including two plates that provide shock resistance for the display 200 and prevent back-bending, as described previously with respect to FIG. 2A. The housing 210 wraps around the display and finishes with a bezel 205, which may be above or flush with the top surface of the display 200. In the instance of FIG. 3, the bezel 105 is above the top protective sheet 195, which may be a hardened transparent anti-glare covering made from a polymer, such as a polyacrylate or a polyimide.

In the middle of the foldable display 200 is a support plate 250 having material voids 255 in a central folding zone. As discussed in greater detail with respect to FIGS. 4A, 4B, 5A, and 5B, the support plate can be made from a variety of materials, such as polymers, metal, e.g., stainless steel, carbon fiber, or wood veneers. In the embodiment of FIG. 3, the support plate 250 may use conductive or non-conductive materials because there is no sensing mechanism behind the support plate 250. The support plate is typically between 250 µm and 50 µm in thickness. The central folding zone for the support plate 250 is not specifically marked in FIG. 3 for simplicity, but it is roughly the area where the voids 255 have been removed from the support plate 250. A low-modulus adhesive layer 260 is disposed between the support plate 250 and the flexible backplane 275. Finally, in some embodiments, a protection layer 270 may be disposed between the flexible backplane 275 and the low-modulus adhesive layer 260 to protect the flexible backplane 275 from corrosion or electrical malfunction due to contact with the low-modulus adhesive layer 260, which may include conductive material or solvents that may attack the flexible backplane 275. Elements 280, 281, 282, 283, 287, 288, and 290 are the electrophoretic display layer 80, the polymer binder 81, the electrophoretic medium solvent 82, the first particle set 83, the second particle set 87, the capsule wall 88, and the conductive integrated barrier layer 90, as described above with respect to FIG. 1B.)

In the FEPID 200, the sensing is achieved with a flexible capacitive touch layer 294 disposed near the surface of the display 200, and protected a top protective sheet 295, which may be a hardened transparent anti-glare covering made from a polymer, such as a polyacrylate or a polyimide. The flexible capacitive touch layer 294 may provide both touch input by a user's finger and stylus writing with a capacitive touch pen, such as offered by N-Trig Technologies (Tel Aviv, Israel). Because the flexible capacitive touch layer 294 is between the viewer and the electrophoretic display medium the flexible capacitive touch layer 294 must also be light transmissive. The FEPID 200 shown in FIG. 3 additionally includes a front light plate 292, which is illuminated by one or more light sources 291, which may be light-emitting diodes (LED) that are white, or have a range of LED colors to enable color adjustment of the front light depending upon the user's needs.

Accordingly, it can be seen that a module 15 of the invention can be incorporated into a variety of foldable electrophoretic display designs. However, the designs are not limited to FIGS. 2A, 2B, and 3. Rather a wide variety of different digitizing systems can be used with the foldable electrophoretic display modules shown here. For example, active electrostatic sensing (Wacom) may be used with the invention, or infrared sensing, as available from Planar Technologies (Hillsboro, Oregon). Furthermore, various foldable electrophoretic display devices may be integrated into an ecosystem of devices, including WIFI, BLUETOOTH, ZIG-BEE or the like.

Creation of Support Plate with Material Voids

As discussed previously, a support plate (50, 150, 250) for the inventions described herein may be made from polymers, metal, e.g., stainless steel, carbon fiber, or wood veneers. In the instances where a sensing layer will be disposed below the support plate (50, 150, 250) the support plate (50, 150, 250) is best achieved with a non-conductive polymer, such as polyethylene terephthalate, which does not interfere with electromagnetic resonance position sensing between flexible EMR layer 140 and a stylus used on the top surface of the display 100, as described with respect to FIG. 2A. However, for instances in which there is no sensing on the backside of the support plate (50, 150, 250), as in FIG. 3, it is not necessary for the support plate (50, 150, 250) to be nonconductive. Accordingly, alternatives such as stainless steel can be used for FIG. 3. In most instances, the support plate is typically between 250 µm and 50 µm in thickness, for example between 150 µm and 100 µm in thickness.

Figure 5A:
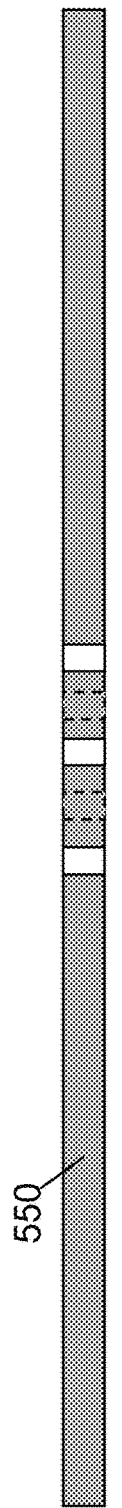
FIG. 5A shows a side view of an embodiment of a support plate having material voids in a central folding zone.
Figure 5B:
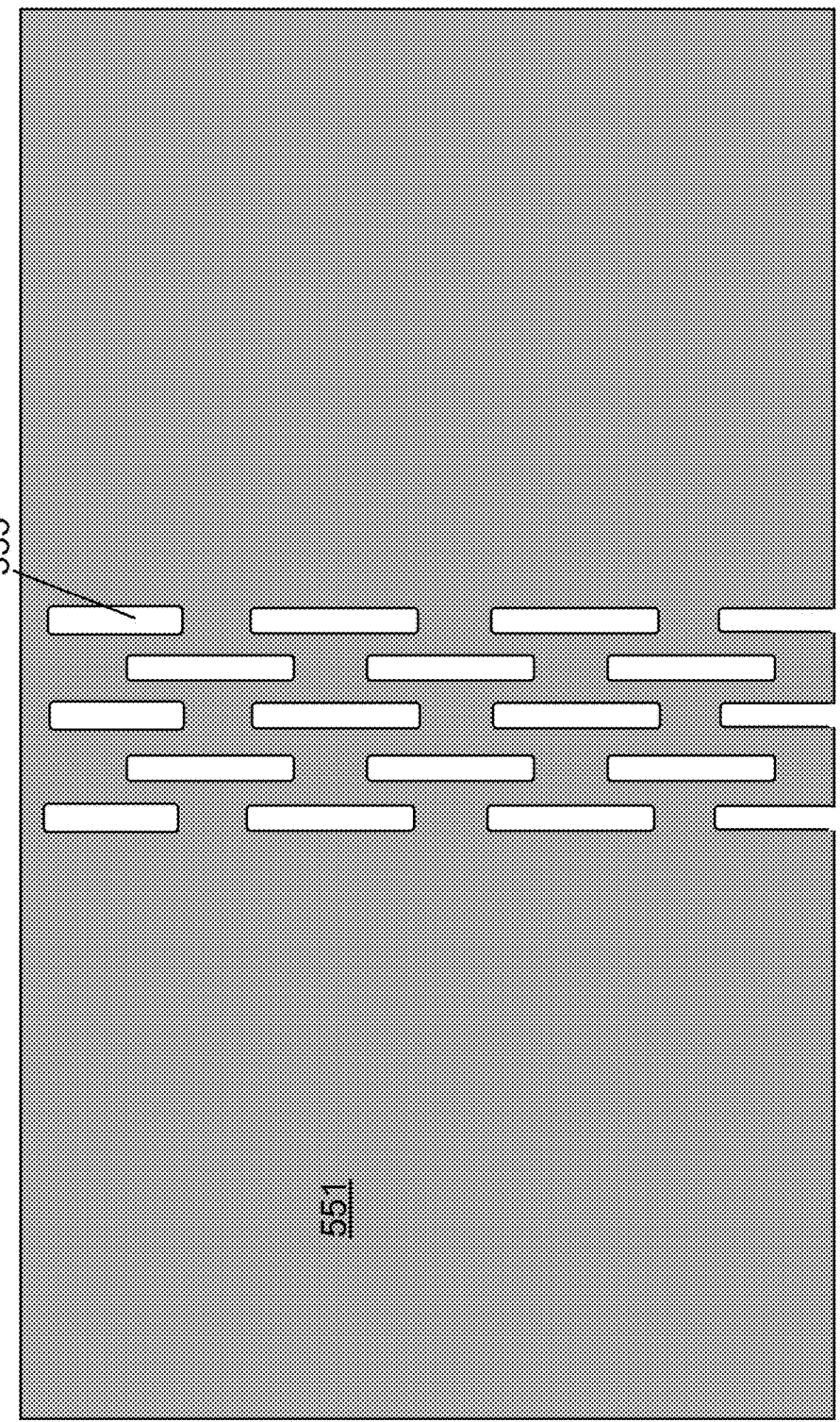
FIG. 5B shows a top view of an embodiment of a support plate having material voids in a central folding zone.

Two embodiments of a support plate having material voids in a central folding zone are shown in FIGS. 4A, 4B, 5A, and 5B (FIG. 4A is a side view of the first embodiment while FIG. 4B is a top view. FIG. 5A is a side view of the second embodiment while FIG. 5B is a top view.) To create the embodiment of FIG. 4A, a singular work piece of material 451 can be milled, cut, embossed, ablated, or laser machined to create voids 455, which allow the support plate 450 to bend in the desired direction repeatedly and with little force. The stiffness of the support plate 450 can be tuned by selecting an appropriate depth of the void relative to the total thickness of the work piece 451. The depth of the voids need not be identical across the piece and may be cut, e.g., as a Gaussian distribution with the greatest depth in the center and progressively shallower cuts moving away from the center. The central folding zone for the support plate 450 is not specifically marked in FIG. 4A for simplicity, but it is roughly the area where the voids 455 have been removed from the support plate 450. The central folding zone may be less than 20% of the total surface area of the support plate 450, e.g., less than 10% of the total surface area of the support plate 150, e.g., less than 5% of the total surface area of the support plate 450.

Support plates having material voids are not limited to the cut pattern shown in FIGS. 4A and 4B. For example, a workpiece 551 may have a series of voids 555 cut from the workpiece 551 to create a central folding zone. In the embodiment of FIGS. 5A and 5B, the support plate 550 may be metal, in which case the voids may be stamped or milled from the workpiece 551. Alternatively, if the workpiece 551 is a polymer or carbon fiber, the voids 555 may be created with laser cutting.

Definitions

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" or "gray scale" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic display comprising:
a support plate;
a low-modulus adhesive foam;
a flexible backplane that includes an active matrix;
a layer of electrophoretic display media adjacent the flexible backplane; and
a conductive integrated barrier.

2. The electrophoretic display of claim 1, further comprising an edge seal coupled to the flexible backplane, the layer of electrophoretic display media, and the conductive integrated barrier.

3. The electrophoretic display module of claim 1, wherein the layer of electrophoretic display media is contained in a layer of microcells.

4. The electrophoretic display module of claim 1, wherein the layer of electrophoretic display media is contained in microcapsules and the microcapsules are held in place by a polymer binder.

5. The electrophoretic display module of claim 1, further comprising a protective sheet adjacent the conductive integrated barrier.

6. The electrophoretic display module of claim 5, further comprising an edge seal coupled to the flexible backplane, the layer of electrophoretic display media, the conductive integrated barrier, and the protective sheet.

7. The electrophoretic display of claim 1, further comprising an electromagnetic resonance (EMR) sensor layer, thereby allowing a user of the electrophoretic display to interact with the electrophoretic display using a stylus.

8. The electrophoretic display of claim 7, further comprising a touch sensitive layer, thereby allowing a user of the electrophoretic display to interact with the electrophoretic display using a finger touch.

9. The electrophoretic display of claim 1, further comprising a touch sensitive layer, thereby allowing a user of the electrophoretic display to interact with the electrophoretic display using a finger touch.

10. The electrophoretic display of claim 1, wherein the conductive integrated barrier additionally comprises a color filter array (CFA).

* * * * *